United States Patent
Tada et al.

[15] 3,674,897
[45] July 4, 1972

[54] PROCESS FOR MANUFACTURING TRIALKYL PHOSPHITES

[72] Inventors: Fusao Tada, Nara-shi; Seiei Inamine, Osaka-shi; Tsutomu Hatanaka, Sakai-shi, all of Japan

[73] Assignee: Sakai Chemical Industry Company Limited, Osaka-fu, Japan

[22] Filed: Nov. 25, 1969

[21] Appl. No.: 879,933

[52] U.S. Cl.....................260/976, 252/49.8, 252/358, 260/45.7 P, 260/959, 260/967, 260/984
[51] Int. Cl.........................C07f 9/08, C10m 1/46
[58] Field of Search..................260/976

[56] References Cited

UNITED STATES PATENTS 3,335,204  8/1967  Scherer et al..........................260/976

Primary Examiner—Lewis Gotts
Assistant Examiner—Anton H. Sutto
Attorney—Larson and Taylor

[57] ABSTRACT

A process for manufacturing trialkyl phosphite comprises adding with stirring a phosphorus trihalide at a temperature of $-5°$ to $30°$ C to at least stoichiometric amount of an aliphatic alcohol having one to 18 carbon atoms in the presence of at least one of an organic acid and ammonium salt thereof while introducing ammonia to the reaction system to maintain the pH value in the system in the range of 6.5 to 10.0 to thereby effect the reaction of the phosphorus trihalide and the aliphatic alcohol to produce trialkyl phosphite. Said organic acid has a dissociation constant in water at $25°$ C of $1 \times 10^{-7}$ to $9 \times 10^{-5}$.

8 Claims, No Drawings

PROCESS FOR MANUFACTURING TRIALKYL PHOSPHITES

This invention relates to an improved process for manufacturing trialkyl phosphites which are useful as stabilizers for synthetic resins, additives to lubricants, antifoaming agents, intermediates for producing various chemicals, etc.

It is well known in the art that trialkyl phosphites can be produced by the reaction of phosphorus trihalides with aliphatic alcohols which is represented by the following equation (1):

$$PX_3 + 3ROH \rightarrow P(OR)_3 + 3HX \qquad (1)$$

wherein X is a halogen atom and R is an alkyl group.

In the above reaction the hydrogen halide formed reacts with the product, trialkyl phosphite, to produce alkyl halide and dialkyl hydrogen phosphite, whereby the yield of the desired trialkyl phosphite is reduced. This side reaction is shown in the following equation (2):

$$P(OR)_3 + HX \longrightarrow (RO)_2\underset{\underset{O}{\|}}{P}-H + RX \qquad (2)$$

wherein R and X are the same as defined before.

To prevent the above side reaction it is also known to use acid-binding agents, such as alkali metal alcoholates, primary or tertiary amines and ammonia. However, alkali metal alcoholates and amines are expensive, and the use of the former makes handling procedure difficult due to the strong basic and hygroscopic properties thereof and the use of the latter requires very complicated procedure owing to the toxicity and the necessity of recovery thereof. Ammonia is most economical, but when it is used the undesired side reactions occur unless the ammonia exists in the reaction system in the strictly accurate amount equimolar to the hydrogen halide formed. Namely, if the amount of ammonia in the system is insufficient the side reaction shown in equation — (2) described before may occur and if excess the side reactions shown in the following equations (3) to (5) may occur.

$$PX_3 + 6NH_3 \rightarrow P(NH_2)_3 + 3NH_4X \qquad (3)$$

$$ROPX_2 + b4NH_3 \rightarrow ROP(NH_2)_2 2NH_4X \qquad (4)$$

$$(RO)_2PX + 2NH_3 \rightarrow (RO)_2PNH_2 NH_4X \qquad (5)$$

wherein R and X are the same as defined before.

As it is extremely difficult to accurately adjust the amount of ammonia in the reaction system without complicated procedures which require great skill, these side reactions are unavoidable, reducing the yield of the desired trialkyl phosphites. To prevent the above side reactions it is proposed to carry out at a temperature of −30° to −20°C the reaction of phosphorus trihalide and aliphatic alcohol in the presence of ammonia (Cf. British Pat. No. 749,550). However, this process is not practical in commercial production as the reaction has to be conducted at such a low temperature in spite of exothermic reaction.

As mentioned above all the conventional methods heretofore proposed are not satisfactory for the purpose of industrial production.

One object of the invention is accordingly to provide an improved process for manufacturing trialkyl phosphites from phosphorus trihalides and alcohols which is free of the aforementioned drawbacks of the conventional methods.

Another object of the invention is to provide a process for manufacturing trialkyl phosphites of high purity in a high order of yield without being accompanied by the undesired side reactions.

A further object of the invention is to provide a process for manufacturing trialkyl phosphites economically and on commercial scale with simple procedures.

The above and other objects of the invention will be apparent from the following description.

The process of the invention comprises adding with stirring a phosphorus trihalide at a temperature of −5° to 30°C to at least stoichiometric amount of an aliphatic alcohol having one to 18 carbon atoms in the presence of at least one of an organic acid and ammonium salt thereof while introducing ammonia to the reaction system to maintain the pH value in the system in the range of 6.5 to 10.0 to thereby effect the reaction of the phosphorus trihalide and the aliphatic alcohol to produce trialkyl phosphite, said organic acid having a dissociation constant in water at 25°C of $1 \times 10^{-7}$ to $9 \times 10^{-5}$, and separating the trialkyl phosphite thus produced from the resultant reaction mixture.

According to the research of the present inventors it has been found that when the reaction of phosphorus trihalides and aliphatic alcohols to produce trialkyl phosphites in which ammonia is used as an acid-binding agent is carried out in the presence of organic acid having a dissociation con-stant in water at 25°C ranging from $1 \times 10^{-7}$ to $9 \times 10^{-5}$ and/or ammonium salt thereof the pH value in the reaction system can be readily controlled to a constant value within the range of 6.5 to 10.0 and the undesired side reactions can be effectively prevented at a reaction temperature of −5° to 30°C which is far more available as compared with the temperature applied in the known method in which ammonia is used as an acid-binding agent, whereby the desired trialkyl phosphites having high purity can be obtained in a high order of yield on a commercial scale.

The phosphorus trihalides to be used in the invention include, for example, phosphorus trichloride and phosphorus tribromide, particularly preferable being phosphorus trichloride.

The aliphatic alcohols to be used in the invention are those having 1 to 18 carbon atoms, such as methanol, ethanol, 2-chloroethanol, isopropanol, n-propanol, n-butanol, 2-ethylhexanol, n-octanol, isodecanol dodecanol, octadecanol, etc. Among them the alcohols of 1 to 8 carbon atoms are desirable. In the invention it is preferable to use the alcohols in anhydrous state. In general, the alcohol may be used in at least stoichiometric amount relative to the phosphorus trihalide, i.e., in at least 3 mole per mole of the phosphorus trihalide. Preferably the alcohol is used in an excess amount of 5 to 150 mole percent to the stoichiometric amount.

In the invention it is essential to use an organic acid having a specific dissociation constant and/or ammonium salt thereof. According to the research of the present inventors it has been found that the dissociation constant of the organic acid is critical in the present invention and that only the use of the organic acid having a dissociation constant in water at 25°C of $1 \times 10^{-7}$ to $9 \times 10^{-5}$ and/or ammonium salt thereof can effectively prevent the undesired side reactions which are incidental to the case of using ammonia. If the acid having a dissociation constant of higher than $9 \times 10^{-5}$ is used the desired trialkyl phosphite produced may rather be decomposed by the acid used, while if the acid having a dissociation constant of lower than $1 \times 10^{-7}$ is used the undesired side reactions can not be prevented effectively. Preferably dis-sociation constant of the acid is in the range of $5.0 \times 10^{-6}$ to $5.0 \times 10^{-5}$. The representative examples of the organic acids having a dissociation constant of $1 \times 10^{-7}$ to $9 \times 10^{-5}$ are, for example, acetic acid, propionic acid, butyric acid, caproic acid, valeric acid, succinic acid, tartaric acid, benzonic acid, cinnamic acid, phthalic acid, ascorbic acid, monomethyl phosphate, monobutyl phosphate, etc. Of these acids aliphatic or aromatic mono- or di-carboxylic acids are preferable, the most desirable being acetic acid, propionic acid, butyric acid, valeric acid, succinic acid, phthalic acid, etc. When the acids are dicarboxylic acids, those acids at least one of whose carboxyl groups has a dissociation constant in water in the range of $1 \times 10^{-7}$ to $9 \times 10^{-5}$ may be used. The amount of the organic acids to be used is in the range of 1 to 30 mole percent, based on the mole of the phosphorus trihalide. Using the acid in less amount results in poor effect in prohibiting the side reactions and in larger amount undesirable side reactions may occur due to the excess of the acid. Preferable amount of the acid to the phosphorus trihalide is in the range of 3 to 10 mole percent.

The present process is preferably conducted in the presence of diluents, though the reaction may proceed in the absence thereof. It is also possible to use larger amounts of the starting alcohol simultaneously serving as a diluent. As the diluent can be used hexane, heptane, benzene, toluene, petroleum ether, methylene chloride or like hydrocarbons and the halogenated derivatives thereof, and ethylether or like ethers. The preferable amount of the diluents may vary over a wide range depending upon the reaction temperature, kinds of the trialkyl phosphite produced, etc., but it is usually used in an amount of not larger than 400 volume % based on the volume of the alcohol used and in an amount of not larger than 300 volume % based on the volume of the phosphorus trihalide used.

According to one of the preferred methods of the invention, the organic acid of a dissociation constant of $1 \times 10^{-7}$ to $9 \times 10^{-5}$ may be dissolved in the starting alcohol or a mixture of the alcohol and diluent. When the ammonium salt of the acid is used in the place of or in combination with the acid, it is preferable to introduced ammonia into the solution of the acid dissolved in the alcohol or in the mixture of alcohol and diluent to convert a part or whole of the acid to ammonium salt, though the ammonium salt may be directly dissolved in the alcohol or the mixture of alcohol and diluent. In one of the preferred embodiment of the invention the starting phosphorus trihalide is then added dropwise with stirring to the alcohol or the mixture of alcohol and diluent having dissolved therein the acid and/or ammonium salt thereof, while ammonia gas is introduced into the system. The phosphorus trihalide may be added to the system as it is or in the form of solution dissolved in diluents. It is most preferable in the invention that the acid and ammonium salt thereof coexist in the reaction system. According to the present invention there is no need to lower the reaction temperature to such low range of $-30°$ to $-20°C$ as in the conventional manner, but a reaction tem-perature of $-5°$ to $30°C$ which is more available is applicable. The preferred reaction temperature is in the range of $0°$ to $25°C$ though it may vary in accordance with the kinds of alcohol used, amount of diluents used and other factors. The ammonia may be introduced into the reaction system so as that the pH value in the system is maintained in the range of 6.5 to 10.0, preferably 7.0 to 9.0, whereby the reaction between phosphorus trihalide and alcohol to produce trialkyl phosphite can effectively proceed, the pH value being measured by an electrometric pH measuring device. According to the invention the pH value in the reaction system can be readily controlled to a constant value within the range of 6.5 to 10.0, making it possible to produce the desired trialkyl phosphite with a high purity at a high yield rate without being accompanied by the undesired side reactions. In practical operation it is preferable to determine the supply rate of ammonia to be introduced to the system in accordance with the supply rate of the starting phosphorus trihalide. That is to say, the ammonia may preferably be introduced to the system at a constant rate equivalent to the amount of the hydrogen halide formed which is previously calculated from the supply rate of the phosphorus trihalide added dropwise. When the ammonia is introduced at a constant rate previously determined as above the pH value in the reaction system is easily maintained in the constant value within the appropriate value ±0.5.

The present reaction completes immediately after the completion of the drop by drop addition of the phosphorus trihalide. Usually the phosphorus trihalide is added dropwise in 1.5 to 12 hours. The trialkyl phosphite thus produced can be easily separated from the reaction mixture by the conventional methods. For example, the reaction mixture is filtrated or washed with an alkali solution to remove ammonium halide formed and the desired trialkyl phosphite can be obtained by fractional distillation of the resultant filtrate or oil layer.

According to the present invention the reaction proceeds effectively at a temperature of $-5°$ to $30°C$ which is easy to control, so that it becomes possible to conduct the reaction not only in batch system but also in continuous manner.

For fuller understanding of the invention examples are given below.

EXAMPLE 1

In a 500 ml 4-necked flask equipped with a thermometer, agitator, dropping funnel, ammonia injection pipe and electrometric pH measuring device were placed 60.5 g (1.89 mole) of anhydrous methanol, 320 ml of methylene chloride and 2.2 g(0.03 mole) of propionic acid. To the resultant mixture was added dropwise with violent stirring at 0°C in 2 hours a mixture of 82.5 g (0.6 mole) of phosphorus trichloride and 105 ml of methylene chloride. At the same time ammonia gas was introduced at a rate of 330 to 360 ml/min, whereby the pH value in the system was maintained at 7.5 ±0.5.

After completion of the addition of phosphorus trichloride the resultant reaction mixture was washed with 0.05 N aqueous solution of sodium hydroxide to remove the ammonium chloride formed, after which the resultant oil layer was distilled first under atmospheric pressure and then under reduced pressure, whereby 63.5 g of trimethyl phosphite having a boiling point of $54° - 56°C/100$ mm Hg was obtained. The yield rate was 85.4 mole percent. The resultant trimethyl phosphite had a refractive index of $n_D^{20}$ of 1.4095 and specific gravity of $d_4^{20}$ of 1.053.

For comparison the same operation was carried out without the addition of propionic acid. In either operation an attempt was made to control the pH value in the system by severely adjusting the amount of ammonia to be introduced, but the pH value showed marked variations over a wide range of 2 to 10, and it was impossible to maintain the optimum value. By this reaction 25.8 grams of trimethyl phosphite was obtained. Yield was 34.7 mole percent.

EXAMPLE 2

In the same flask as in Example 1 were placed 48.0 g (1.5 mole) of anhydrous methanol, 200 ml of ethyl ether and 1.5 g (0.02 mole) of propionic acid. To the resultant mixture was added dropwise with violent stirring at $-5°C$ in 2 hours a mixture of 55.0 g (0.4 mole) of phosphorus trichloride and 40 ml of ethyl ether. At the same time ammonia gas was introduced at a rate of 230 – 250 ml/min, whereby the pH value in the system was maintained at 7.5 ±0.5. After completion of the reaction the resultant reaction mixture was filtered to remove ammonium chloride formed and the cake was washed with 200 ml of ethylether. The washed liquid was added to the filtrate and the mixture was distilled first under atmospheric pressure and then under reduced pressure, whereby 40.3 g of trimethyl phosphite boiling at $54° - 56°C/100$ mm Hg. was obtained. The yield rate was 81.2 mole %. The resultant trimethyl phosphite had refractive index of $n_D^{20}$ of 1.4095 and specific gravity of $d_4^{20}$ of 1.054.

EXAMPLE 3

In the same flask as in Example 1 were placed 60.7 g (1.32 mole) of anhydrous ethanol, 110 ml of n-hexane and 1.2 g (0.02 mole) of glacial acetic acid. To the resultant mixture was added dropwise with violent stirring at 5°C in 3 hours a mixture of 55.0 g (0.4 mole) of phosphorus trichloride and 40 ml of n-hexane. At the same time ammonia gas was introduced to the system at a rate of 150 to 170 ml/min., whereby the pH value in the reaction system was maintained at 7.8 ±0.5.

After the reaction 55.8 g of triethyl phosphite boiling at $62° - 64°C/23$ mm Hg was obtained by the same method as in Example 1. The yield rate was 84.1 mole percent. The resultant triethyl phosphite had refractive index of $n_D^{20}$ of 1.4315 and specific gravity of $d_4^{20}$ of 0.969.

For comparison, the similar operation was performed except that no glacial acetic acid was used. In this operation, however it was very difficult to control the pH value by adjusting the feed of ammonium with the pH value varied over a wide range of 2 to 9. The triethyl phosphite produced was 32.1 g (yield rate of 48.3 %).

EXAMPLE 4

In the same flask as in Example 1 were placed 100.0 g (1.35 mole) of n-butanol, 100 ml of methylene chloride and 0.7 g (0.01 mole) of propionic acid. To the resultant mixture was added dropwise with violent stirring at 20°C in 2.5 hours a mixture of 41.3 g (0.3 mole) of phosphorus trichloride and 30 ml of methylene chloride. At the same time ammonia gas was introduced at the rate of 130 – 160 ml/min, whereby the pH value in the system was maintained at 8.0±0.5.

After the reaction, 67.3 g of tributyl phosphite boiling at 119° – 120°C/10 mm Hg was obtained by the same method as in Example 1. The yield rate was 89.6 mole percent. The resultant tributyl phosphite had refractive index of $n_D^{20}$ of 1.4317 and specific gravity of $d_4^{20}$ of 0.924

EXAMPLE 5

In the same flask as in Example 1 were placed 100.0 g (1.35 mole) of n-butanol, 150 ml of petroleum ether and 0.8 g (0.009 mole) of butyric acid. To the resultant mixture 41.3 g (0.3 mole) of phosphorus trichloride was added dropwise with violent stirring at 20°C in 2 hours. At the same time ammonia gas was introduced at the rate of 170 – 190 ml/min, whereby the pH value of the reaction system was maintained at 8.2 ± 0.5. After the reaction the reaction mixture was washed with water to remove the ammonium chloride formed and then by fractional distillation 66.6 g of tributyl phosphite boiling at 119° – 120°C/10 mm Hg was obtained. The yield rate was 88.7 mole percent. The resultant tirbutyl phosphite had refractive index of $n_D^{20}$ of 1.4316 and specific gravity of $d_4^{20}$ of 0.925.

EXAMPLE 6

In the same flask as in Example 1 were placed 73.3 g (0.99 mole) of butanol, 110 ml of n-hexane and 2.5 g (0.02 mole) of succinic acid. To the resultant mixture was added dropwise with violent stirring at 10°C in 4 hours a mixture of 41.3 g (0.3 mole) of phosphorus trichloride and 40 ml of n-hexane. At the same time ammonia gas was introduced at the rate of 80 – 100 ml/min, whereby the pH value in the system was maintained at 8.3±0.5.

After the reaction 67.9 g of tributyl phosphite boiling at 122° – 123°C/12 mm Hg was obtained by the same manner as in Example 1. The yield rate was 90.5 mole percent. The resultant tributyl phosphite had refractive index of $n_D^{20}$ of 1.4317 and specific gravity of $d_4^{20}$ of 0.925.

EXAMPLE 7

In the same flask as in Example 1 were placed 73.3 g (0.99 mole) of n-butanol, 100 ml of n-hexane and 2.6 g (0.03 mole) of butyric acid. To the resultant mixture was added dropwise with violent stirring at 25°C in 2 hours a mixture of 41.3 g (0.3 mole) of phosphorus trichloride and 30 ml of n-hexane. At the same time ammonia gas was introduced at the rate of 170 – 200 ml/min, whereby the pH value in the reaction system was maintained at 8.3±0.5.

After the reaction, 66.2 g of tributyl phosphite boiling at 120° – 121°C/11 mm Hg. was obtained by the same method as in Example 1. The yield rate was 88.1 mole percent. The resultant produce had refractive index of $n_D^{20}$ of 1.4316 and specific gravity of $d_4^{20}$ of 0.925.

EXAMPLE 8

In the same flask as in Example 1 were placed 234.0 g (1.8 mole) of ethyl 2-hexanol, and 1.2 g (0.015 mole) of ammonium acetate. To the resultant mixture 41.3 g (0.3 mole) of phosphorus trichloride was added dropwise with violent stirring at 20°C in 2 hours. At the same time ammonia gas was introduced at the rate of 170 – 190 ml/min., whereby the pH value in the system was maintained at 8.5 ± 0.5. After the reaction, 114.9 g of tris-(2-ethylhexyl) phosphite boiling at 160° – 162°C/0.5 mm Hg was obtained by the same method as in Example 1. The yield rate was 91.5 mole percent. The resultant tris-(2-ethylhexyl) phosphite had refractory index of $n_D^{20}$ of 1.4495 and specific gravity of $d_4^{20}$ of 0.902.

EXAMPLE 9

In the same flask as in Example 1 were placed 156.0 g (1.2 mole) of 2-ethylhexanol, 150 ml of benzene and 5 g (0.03 mole) of phthalic acid. To the resultant mixture was added dropwise with violent stirring at 30°C in 2.5 hours a mixture of 41.3 g (0.3 mole) of phosphorus trichloride and 30 ml of benzene. At the same time ammonia gas was introduced at the rate of 130 – 160 ml/min, whereby the pH value in the system was maintained at 8.8±0.5.

After the reaction, 112.8 g of tris-(2-ethylhexyl) phosphite boiling at 160° – 162°C/0.5 mm Hg was obtained by the same method as in Example 1. The yield rate was 89.8 mole percent. The resultant tris-(2-ethylhexyl) phosphite had refractive index of $n_D^{20}$ of 1.4494 and specific gravity of $d_4^{20}$ of 0.902.

What we claimed is:

1. A process for manfacturing trialkyl phosphite which comprises adding with stirring at a temperature of −5° to 30°C a phosphorus trihalide selected from the group consisting of phosphorus trichloride and phosphorus tribromide to at least stoichiometric amount of an aliphatic alcohol having one to 18 carbon atoms in the presence of 1 to 30 mole percent, based on the mole of phorphorus trihalide of an organic acid or ammonium salt thereof while introducing ammonia to the reaction system to maintain the pH value in the system in the range of 6.5 to 10.0 to thereby effect the reaction of the phosphorus trihalide and the aliphatic alcohol to produce trialkyl phosphite, and separating the trialkyl phosphite from the resultant reaction mixture, said organic acid having a dissociation constant in water at 25°C of $1 \times 10^{-7}$ to $9 \times 10^{-5}$ and being one species selected from the group consisting of acetic acid, propionic acid, butyric acid, caproic acid, valeric acid, succinic acid, tartaric acid, benzoic acid, cinnamic acid, phthalic acid, ascorbic acid, monomethyl phosphate and monobutryl phosphate.

2. The process for manufacturing trialkyl phosphite according to claim 1, in which said organic acid has a dissociation constant in water at 25°C of $5 \times 10^{-7}$ to $5 \times 10^{-5}$.

3. The process for manufacturing trialkyl phosphite according to claim 1 in which said organic acid is at least one species selected from the group consisting of acetic acid, propionic acid, butyric acid, valeric acid, succinic acid and phthalic acid.

4. The process for manufacturing trialkyl phosphite according to claim 1 in which said amount of the organic acid and/or ammonium salt thereof is in the range of 3 to 10 mole percent, based on the mole of the phosphorus trihalide.

5. The process for manufacturing trialkyl phosphite according to claim 1 in which said reaction temperature is in the range of 0° to 25°C.

6. The process for manufacturing trialkyl phosphite according to claim 1 in which said pH value in the reaction system is in the range of 7.0 to 9.0.

7. The process for manufacturing trialkyl phosphite according to claim 1 in which said phosphorus trihalide is phosphorus trichloride.

8. The process for manufacturing trialkyl phosphite according to claim 1 in which said aliphatic alcohol has one to eight carbon atoms.

* * * * *